UNITED STATES PATENT OFFICE.

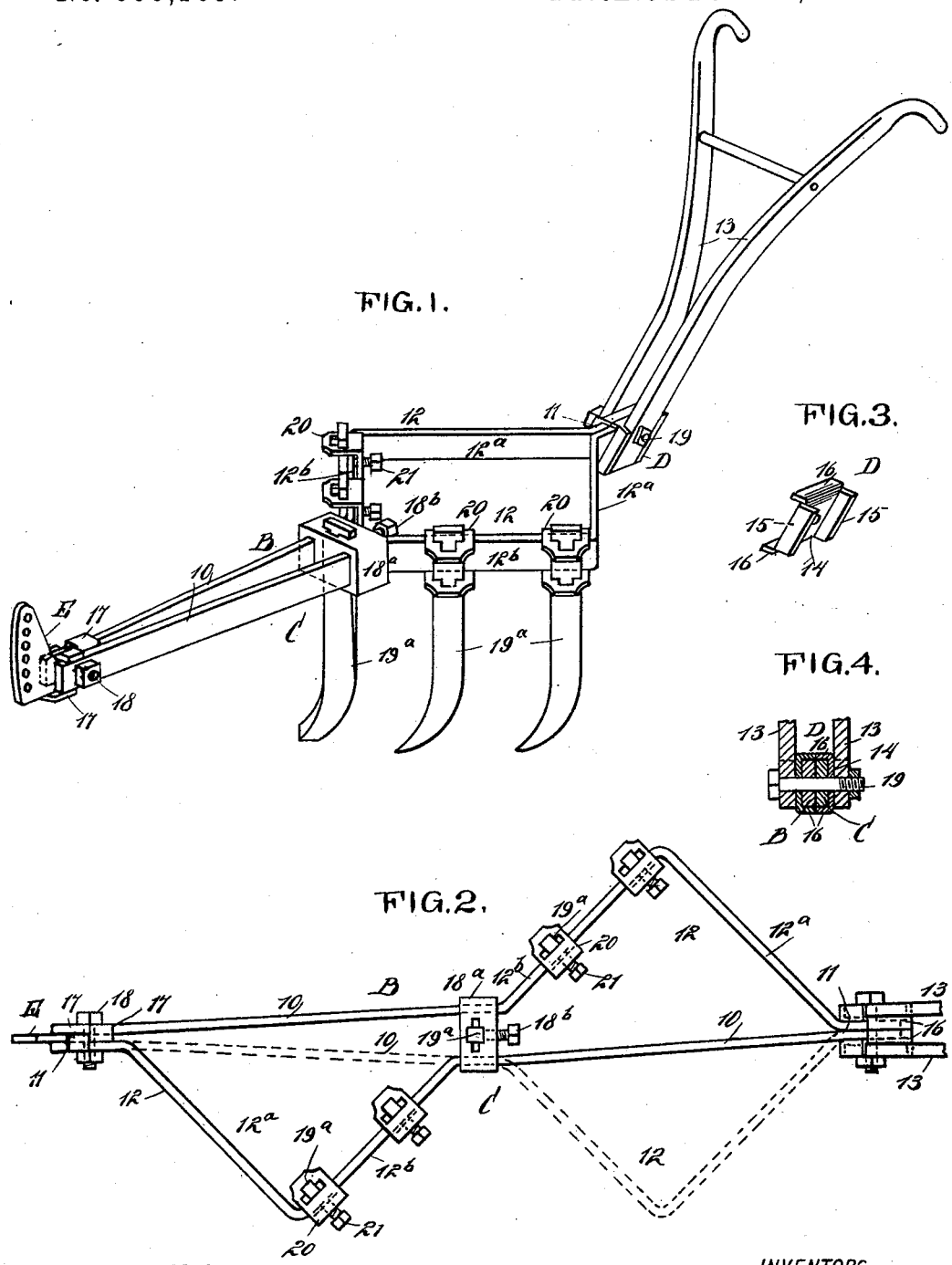

NATHAN P. COOK AND WILLIAM A. WHITFIELD, OF MONROE, LOUISIANA.

CULTIVATOR AND HARROW.

SPECIFICATION forming part of Letters Patent No. 599,165, dated February 15, 1898.

Application filed June 22, 1897. Serial No. 641,766. (No model.)

*To all whom it may concern:*

Be it known that we, NATHAN P. COOK and WILLIAM A. WHITFIELD, of Monroe, in the parish of Ouachita and State of Louisiana, have invented a new and useful Improvement in Cultivators and Harrows, of which the following is a full, clear, and exact description.

The object of our invention is to provide a frame for a harrow or a cultivator which may be expeditiously and conveniently converted from a V or an A harrow or cultivator to a side cultivator or harrow frame, either right or left hand.

A further object of the invention is to construct the body portion of the frame in practically but two parts, providing means for the attachment thereto of a clevis and the handles and means for connecting the blades, teeth, or shovels to the said frame.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the cultivator-frame in its V or A shape. Fig. 2 is a plan view of a frame converted into use for a side cultivator or harrow and showing in dotted lines the A or V shape from which the frame was changed. Fig. 3 is a perspective view of one of the clips adapted for attachment to a handle of the implement; and Fig. 4 is a vertical section through the rear end of the frame, the handles, and the clip connected therewith.

The frame of the cultivator is made practically in two parts—namely, two bars B and C. Each bar comprises a straight section 10, which forms one end, a shorter straight section 11 constituting the other end, and an angular intermediate section 12, made up of two parts $12^a$ and $12^b$, the member $12^a$ connecting with the shorter end member 11 and the member $12^b$ connecting with the longer end member 10.

Handles 13 are adapted for attachment to the rear portion of the cultivator or harrow frame no matter in what form it may be employed. These handles are of the ordinary construction and are given the usual raking position, and each handle is provided with a clip D, one of which is shown in detail in Fig. 3. The clip consists of a body portion 14, made of metal. The sides are parallel and are inclined, and from each inclined side an outwardly-extending flange 15 is projected, while upon the top and bottom of this body an inwardly-extending horizontal flange 16 is formed. The lower ends of the handles fit upon the outer faces of the body portions 14 of the clips between the side flanges 15, while the top and bottom flanges 16 are carried over the top and bottom portions of the shorter end sections 11 of the frame.

A bolt 19, provided with a suitable nut, is passed through the handles, the clip and the rear end portion of the frame holding all parts in close engagement. A clevis E is located at the forward end of the frame, being between the bars B and C, and this clevis is provided at top and bottom with reversely-arranged horizontal lips or lugs 17, which extend over the bottom and top portions of the said bars B and C, the clevis being held in position on the bars by a bolt 18, having a suitable nut.

A spacing-block $18^a$ is provided for the frame, and through this block the long straight sections 10 of the bars B and C are passed. The block $18^a$ is provided with a set-screw $18^b$ and with a central opening which receives a cultivator tooth or blade or a harrow-tooth $19^a$, as shown in Fig. 1. Clamps 20 are located on the members $12^b$ and also on the members $12^a$, if desired, of the angular sections of the frame. Each of these clamps consists of a vertical member which extends upward along the inner face of the bar and top and bottom horizontal members which are carried outward beyond the outer faces of the bar, these upper and lower members having openings to receive the harrow-teeth or cultivator teeth or blades $19^a$, and the clamps are held to the frame by means of set-screws 21.

When the implement is to be used as an A or a V harrow or cultivator, the angular sections are placed opposite each other, as shown in Fig. 1, as are likewise the longer end sections 10 and the shorter end sections 11.

When a side cultivator is needed, either right hand or left hand, the same bars and the same parts are used, it being simply necessary to place the angular section of one of the bars opposite the longer straight section 10 of the opposing bar. All of the binding or connecting devices are applied in the same manner in both forms of the implement.

Under the construction shown it is obvious that with the two bars B and C a farmer will be enabled to provide himself with an ordinary A or V frame or a side frame, right or left, and that the change can be expeditiously and conveniently made and the frame held as securely in one position as in the other.

Having thus described our invention, we claim as new and desire to secure by Letters Patent—

1. A cultivating apparatus having a frame formed of two duplicate bars, each bar comprising a straight section and an angular section, the angular section running outward and then inward from one end of the straight section, so that the two angular sections when arranged oppositely describe a rectangular figure, means for holding the two sections in removable connection with each other whereby the disposition of the sections may be changed, cultivating-teeth attached to the bars, and handles attached to the bars.

2. A cultivating apparatus having a frame formed of two duplicate bars, each bar having a straight portion and an angular portion, and each angular portion running outward and then inward from one end of the straight portion, cultivating-teeth attached to the outwardly-extending part of each angular portion of each bar, means for removably joining the bars whereby the bars may be placed with their straight and angular portions respectively opposite each other or with their straight and angular portions respectively removed from each other, and handles attached to the frame.

NATHAN P. COOK.
WILLIAM A. WHITFIELD.

Witnesses:
G. SURGHNAR,
FRANK P. STUBBS.